United States Patent [19]

Usami

[11] 4,129,995
[45] Dec. 19, 1978

[54] EVAPORATION PRESSURE CONTROL DEVICE

[75] Inventor: Kiyoshi Usami, Ohbu, Japan
[73] Assignee: Nippondenso Co., Ltd., Kariya, Japan
[21] Appl. No.: 767,147
[22] Filed: Feb. 9, 1977
[51] Int. Cl.$^2$ .......................... F25B 41/04; B60H 3/04; F16K 31/12; F16K 31/36
[52] U.S. Cl. ........................................ 62/217; 62/239; 137/494; 137/505.13
[58] Field of Search ............... 137/505.13, 461, 462, 137/494, 568; 62/217, 196, 214, 239

[56] References Cited

U.S. PATENT DOCUMENTS

| 1,406,216 | 2/1922 | Olson | 137/494 |
| 1,768,602 | 7/1930 | Hull | 62/217 |
| 1,907,162 | 5/1933 | Webb | 137/505.13 |
| 2,854,025 | 9/1958 | Terry | 137/505.13 |
| 3,123,094 | 3/1964 | Toschkoff | 137/505.13 |
| 3,899,897 | 8/1975 | Boerger et al. | 62/217 |

Primary Examiner—Lloyd L. King
Attorney, Agent, or Firm—Cushman, Darby & Cushman

[57] ABSTRACT

In a refrigeration cycle of an air conditioning system of the type, in which lubricating oil for lubricating a compressor circulates through the refrigeration cycle together with refrigerant, an evaporation pressure control device is provided between an evaporator and the compressor for not only controlling the amount of refrigerant circulating through the refrigeration cycle in response to the pressure of the refrigerant out of the evaporator, but permitting the refrigerant to return to the compressor when the pressure of the refrigerant out of the evaporator is extremely decreased owing to the leakage of the refrigerant, whereby seizure of the compressor can be prevented.

6 Claims, 7 Drawing Figures

FIG. 3.
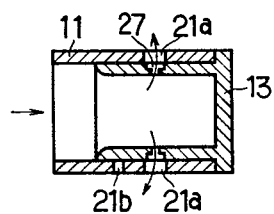
FIG.3A.
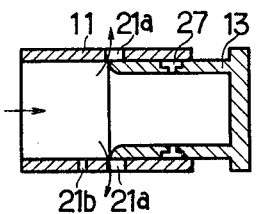
FIG.3B.
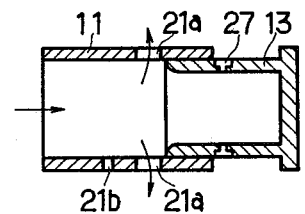
FIG.3C.
FIG. 4.
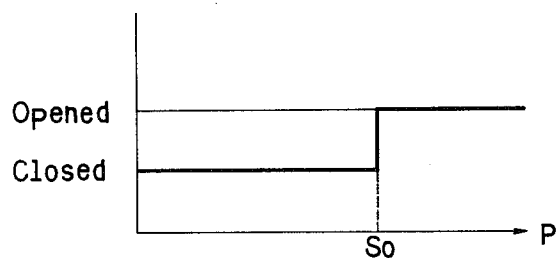
FIG. 5.
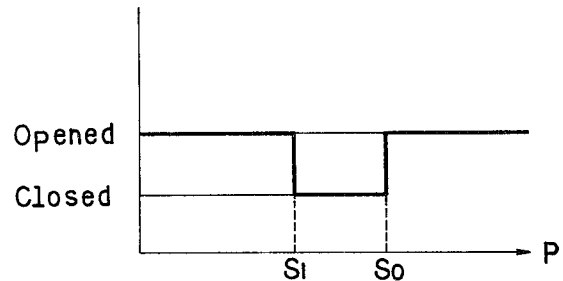

EVAPORATION PRESSURE CONTROL DEVICE

BACKGROUND OF THE INVENTION

(1) Field of the Invention

The present invention relates to an evaporation pressure control device for a refrigeration cycle, especially for a refrigeration cycle of an air conditioning system of an automotive vehicle.

(2) Description of Prior Art

In a refrigeration cycle of an air conditioning system of the type, in which lubricating oil for lubricating a compressor circulates through the refrigeration cycle together with refrigerant, when the air conditioning system is operated with shortage of the refrigerant resulting from the leakage thereof the amount of the lubricating oil as well as the refrigerant returning to the compressor decreases because of impounding in various parts of the refrigeration cycle, whereby the temperature of the compressor increases.

Especially, in such a refrigeration cycle as has an evaporation pressure control valve, when the pressure of the refrigerant out of an evaporator decreases because of the leakage of the refrigerant, the control valve is kept closed to stop returning of the refrigerant and the lubricating oil to the compressor, resulting in seizure in the compressor.

SUMMARY OF THE INVENTION

It is therefore an object of the present invention to overcome the above drawback and to provide an improved air conditioning system.

It is another object of the present invention to provide a novel and useful evaporation pressure control device for an air conditioning system so that a compressor can be protected from seizure when the leakage of the refrigerant occurs.

According to an aspect of the present invention, an evaporation pressure control device so operates as to again open and communicate an inlet with an outlet of the control device when the leakage of the refrigerant occurs so that the refrigerant as well as the lubricating oil may return to the compressor, to thereby protect the compressor from the seizure.

Other objects, features and advantages of the present invention will become more apparent from the following detailed description of the preferred embodiment when read in conjunction with the accompanying drawings.

BRIEF DESCRIPTION OF THE DRAWINGS

FIGS. 3A, 3B and 3C are schematic diagrams showing the operating conditions of a piston with respect to a cylinder of the control device, and FIGS. 4 and 5 are graphical representations of the open and closed states of an evaporation pressure control device with respect to a pressure at an inlet portion of the device in accordance with the conventional and present devices, respectively.

DETAILED DESCRIPTION OF THE PREFERRED EMBODIMENT

Figure 1:
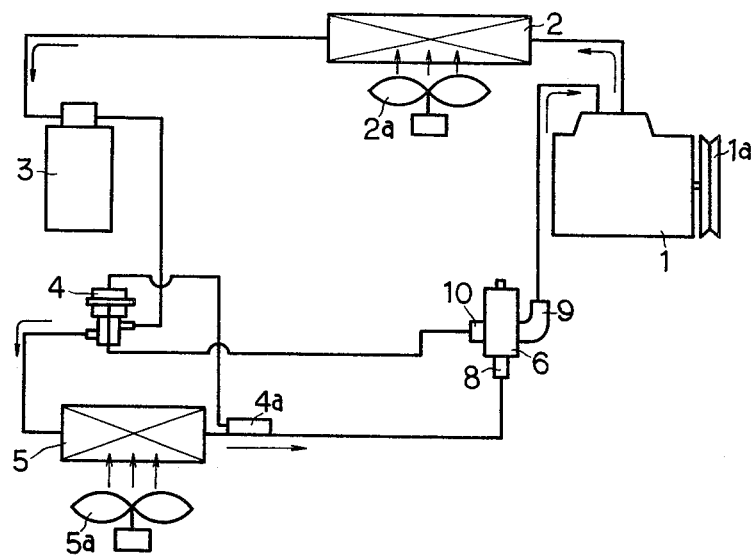
FIG. 1 is a schematic diagram of a refrigeration cycle in which an evaporation pressure control device according to the present invention is provided.

In FIG. 1, a compressor of a refrigeration cycle of an air condition system for an automotive vehicle is generally indicated at numeral 1, which is driven by an internal combustion engine (not shown) through a magnetic clutch 1a to compress refrigerant. The compressed refrigerant circulates to a condensor 2 where the refrigerant is cooled and condensed. The condensor 2 includes a cooling fan 2a driven by, for example, the engine to cool the condensor 2. The condensed refrigerant is stored in a receiver 3 and flows through an expansion valve 4 to an evaporator 5 where the condensed regrigerant is evaporated. The evaporator 5 includes a blower fan 5a usually driven by a blower motor (not shown). The air passing around the evaporator 5 is therefore cooled as in a usual manner and thus makes a passenger room comfortable. Numeral 4a designates a temperature sensing device provided at an outlet side of the evaporator 5 for sensing the temperature of the refrigerant out of the evaporator 5 and actuating the expansion valve 4 to control the amount of the refrigerant flowing therethrough from the receiver 3 to the evaporator 5 in response to the sensed temperature.

An evaporation pressure control device 6 is provided between the evaporator 5 and the compressor 1 for actuating the expansion valve 4 in response to the pressure of the refrigerant out of the evaporator 5 to control not only the amount of the refrigerant flowing from the receiver 3 to the evaporator 5 but the amount of the refrigerant flowing from the evaporator 5 to the compressor 1, thus to control the pressure of the refrigerant out of the evaporator 5.

As above, the expansion valve 4, which is well-known in the art, controls the amount of the refrigerant flowing to the evaporator in response to the temperature and the pressure of the refrigerant out of the evaporator 5 in order to operate the evaporator 5 in a suitable manner.

Figure 2:
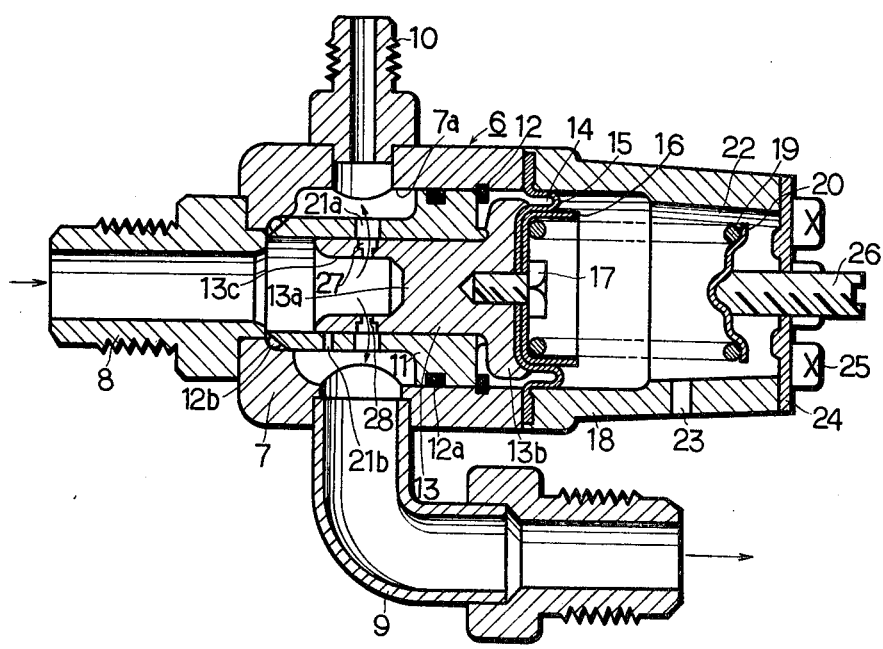
FIG. 2 is a sectional view showing an embodiment of the control device according to the present invention.

Next, the detailed construction of the evaporation pressure control device 6 will be explained hereinafter with reference to FIG. 2.

The device 6 includes a first casing 7 made of a metallic material provided with an inlet portion 8 communicated with the evaporator 5, an outlet portion 9 connected to the compressor 1 and a pressure transferring portion 10 connected to the expansion valve 4 for applying the pressure thereto, wherein the above three portions 8, 9 and 10 are generally made of a metallic material and fixed to the casing 7 by means of brazing.

The first casing 7 has therein a cylindrical bore 7a into which a cylinder 11 is inserted and the cylinder 11 is axially restricted by a circlip (or snap washer) 12. O-rings 12a and 12b are interposed between the cylinder 11 and the inner surface of the bore 7a. Thus, the cylinder 11 forms inside and outside chambers in the casing 7. A plurality of holes 21a are provided on the cylinder 11 extending radially from the inside to the outside of the cylinder 11 (Two holes are shown in the drawing) for operatively communicating the inside chamber with the outside chamber. A further hole (or opening) 21b is formed on the cylinder 11 at a portion longitudinally different from that of the holes 21a. The hole 21b likewise communicates the inside with the outside of the cylinder 11 when opened.

Slidably disposed inside of the cylinder 11 is a piston 13 which comprises a small section 13a and a large section 13b to control the opening and closing of the holes 21a and 21b. As shown in the drawing, the small section 13a is provided with a bore 13c, an annular groove 27 on the outer peripheral surface, and apertures 28 communicating the bore 13c with the groove 27. Thus, the bore 13c, the apertures 28 and the groove form a fluid passage from the inside chamber to the outside chamber in the casing 7.

The large section 13b is coupled to a diaphragm 15 which is interposed between the large section 13b and a metallic diaphragm guide 16 and fixed together by a screw 17. The outer periphery of the diaphragm 15 is interposed between and fixedly secured to the first casing 7 and a second casing 18 which are put together by means of bolt and nut (not shown), so that a pressure chamber 14 is defined by the end of the cylinder 11, the first casing 7 and the diaphragm 15 and that the diaphragm 15 is deformed in response to the pressure in the pressure chamber.

The other end of the second casing 18 is covered by a cover plate 24 which is secured thereto by screws 25. In the casing 18, a coil spring 19 is disposed between the diaphragm guide 16 and a spring stopper 20 for urging the piston 13 to the leftward direction. Numeral 26 designates an adjusting screw screwed into the cover plate 24 and the end thereof abuts on the spring stopper 20 for adjusting the urging force of the spring as in a usual manner. Numeral 23 designates an opening formed on the second casing for drawing out water from the inside 22 of the casing 18.

The mode of the operation of the above explained embodiment will be described with reference to FIG. 3.

When a switch (not shown) for the air conditioning system is closed, the magnetic switch 1a is energized to drive the compressor 1 by the engine (not shown). The compressed refrigerant flows to the condensor 2 where it is cooled and condensed. And thus condensed refrigerant is stored in the receiver 3 and flows through the expansion valve 4 to the evaporator 5. At that time, the refrigerant is expanded and the amount thereof is controlled by the valve 4 in response to the temperature and the pressure of the refrigerant out of the evaporator 5, which are respectively detected by the temperature sensing device 4a and evaporation pressure control device 6, whereby the most effective evaporation and thus the favorable cooling effect can be attained.

When the refrigerant is evaporated in the evaporator 5, the air passing therearound by the blower fan 5a is cooled through the heat exchange between the air and the evaporator 5, thus making the passenger room comfortable.

When the evaporation pressure and the temperature of the refrigerant is extremely decreased (for example, lower than 2.14 kg/cm$^2$ (gauge pressure) and 0° C.), frosting occurs on cooling fins of the evaporator 5 to reduce the cooling effeciency. To prevent such unfavorable condition, the evaporation pressure control device 6 so operates as to decrease the amount of the refrigerant returning to the compressor 1 to increase the evaporation pressure in the evaporator. When the evaporation pressure is increased, the evaporation ability in the evaporator 5 is decreased to some extent so that the temperature of the refrigerant out of the evaporator 5 is also increased.

More detailed operation of the evaporation pressure control device 6 is described hereinafter.

The refrigerant out of the evaporator 5 flows through the inlet portion 8 to the inside of the cylinder 11. A portion of the refrigerant flows to the pressure chamber 14 through spaces formed between the small section 13a of the piston 13 and the cylinder 11, so that the pressure chamber 14 is filled with the refrigerant having a pressure substantially equal to that of the refrigerant in the bore 13c of the piston.

According to the embodiment, the space, through which the refrigerant passes, is approximately 50μ, which is however sufficient to introduce the refrigerant to the pressure chamber. A longitudinal groove may be, of course, formed on the outer peripheral surface of the piston 13 to permit the refrigerant to flow from the bore 13c to the pressure chamber 14.

When the refrigerant under pressure is supplied to the pressure chamber 14, the diaphragm 15 is urged and moved in the rightward direction against the urging force of the spring 19, so that the piston 13 is driven by the diaphragm 15 and moved in the rightward direction to such a position where the urging force caused by the refrigerant in the pressure chamber 14 becomes equal to that of the spring 19 in order to control the amount of the refrigerant flowing from the inlet portion 8 to the outlet portion 9 and then to the compressor 1.

When a cooling load is high as at starting the air conditioning system, the pressure in the bore 13c exceeds a predetermined value to move the piston 13 to the most rightward position as shown in (c) of FIG. 3, so that the holes 21a as well as the hole 21b are fully opened. During that time, the large amount of the refrigerant flows from the inlet portion 8 to the outlet portion 9 through the fully-opened holes 21a and the hole 21b.

On the other hand, when the cooling load decreases, the pressure in the bore 13c is decreased in accordance therewith, so that the piston 13 is moved to the leftward direction as shown in (B) in FIG. 3. As the piston 13 is moved to the leftward direction, the opening area of the holes 21a is decreased, thus to control the amount of the refrigerant flowing from the inlet portion 8 to the outlet portion 9 in response to the evaporation pressure of the refrigerant out of the evaporator 5.

As explained above, as the pressure transferring portion 10 applies the pressure in the outlet portion 9 to the expansion valve 4, the amount of the refrigerant flowing through the expansion valve 4 to the evaporator 5 is also controlled in response to the evaporation pressure out of the evaporator 5 as in a well-known manner.

The above operation proceeds when a required amount of the refrigerant is circulated in the refrigeration cycle.

Then the mode of operation will be explained hereinafter when the leakage of the refrigerant occurs.

When this occurs, the pressure of the refrigerant in the bore 13c is extremely decreased when compared with that in the above-explained normal operation, so that the piston 13 is further moved to the leftward direction until the annular groove 27 formed on the piston 13 becomes in alignment with the holes 21a of the cylinder as shown in (A) of FIG. 3.

When the groove is aligned with the holes 21a, the refrigerant in the bore 13c is permitted to again flow to the outlet portion 9 of the device and then to the compressor 1.

As explained above, according to the present invention, as the refrigerant returns to the compressor when the leakage of the refrigerant occurs, the seizure of the compressor 1 can be prevented.

Now, the function of the further hole (opening) 21b formed on the piston 13 will be explained, however the provision of the further hole 21b is not essential in the present invention while the hole 21b facilitates the above-explained operation.

When the leakage of the refrigerant occurs, the piston 13 is moved in the leftward direction as already explained above from the position shown in (B) of FIG. 3 to the position shown in (A) of FIG. 3. If the hole 21b is not formed on the piston 13, the above leftward movement of the piston 13 during the leakage of the refrigerant is caused by the pressure decrease of the refrigerant in the bore 13c owing to the leakage, whereby the movement of the piston is relatively slow. On the contrary, when the hole 21b is formed on the piston 13 as in the present embodiment, the leftward movement of the piston is caused by not only the pressure decrease in the bore 13c owing to the leakage of the refrigerant but also the pressure decrease owing to the flow of the refrigerant resulting from the suction effect of the compressor 1 from the bore 13c to the outlet portion 9 through the hole 21b, whereby the piston 13 is moved to the most leftward position as shown in (A) of FIG. 3 at a relatively high speed. Accordingly, the hole 21b rapidly moves the piston 13 to the leftward direction.

FIGS. 4 and 5 show the relationship between the pressure in the inlet portion of the evaporation pressure control device and the open and closed state of the device respectively according to the conventional and present devices.

As noted from FIG. 4, the conventional device remains closed when the pressure in the inlet portion becomes lower than $S_0$, while as noted from FIG. 5 the present evaporation pressure control device is again opened when the pressure in the inlet portion becomes lower than $S_1$ during the leakage of the refrigerant to return the refrigerant to the compressor.

What is claimed is:

1. An air conditioning system for an automotive vehicle comprising:

a compressor operatively coupled to and driven by an internal combustion engine for compressing refrigerant;

a condensor connected to said compressor for cooling and condensing the compressed refrigerant;

a receiver connected to said condensor for storing the condensed refrigerant;

an expansion valve connected to said receiver for expanding the refrigerant flowing therethrough, said expansion valve also controlling the amount of the refrigerant flowing therethrough;

an evaporator connected to said expansion valve for evaporating the refrigerant therein to thereby cool the air passing through the evaporator;

temperature sensing means disposed on an outlet side of said evaporator for detecting the temperature of the refrigerant out of said evaporator and also for actuating said expansion valve to control the amount of the refrigerant flowing to said evaporator in response to the detected temperature; and an evaporation pressure control device connected between said evaporator and said compressor for detecting the pressure of the refrigerant out of said evaporator and also actuating said expansion valve to control the amount of the refrigerant flowing to said evaporator in response to the detected pressure in addition to the flow control of the refrigerant in response to the temperature of the refrigerant by said temperature sensing means, said evaporation pressure control device being responsive to an extreme decrease of the pressure of the refrigerant out of said evaporator as an indication of leakage of the refrigerant, in order to return the refrigerant to said compressor, when said leakage occurs, to thereby prevent said compressor from seizure.

2. An air conditioning system according to claim 1, wherein said evaporation pressure control device includes:

a casing having an inlet portion connected to said evaporator and an outlet portion connected to said compressor;

a pressure chamber having a deformable diaphragm and formed in said casing, the refrigerant from said evaporator being introduced into said pressure chamber so that said diaphragm is deformed in response to the pressure produced by the refrigerant introduced into said pressure chamber;

a movable member slidably disposed in said casing and connected to said diaphragm so that said movable member is moved by and with said diaphragm, said movable member controlling the amount of the refrigerant flowing from said inlet portion to said outlet portion in response to the pressure from said evaporator; and means actuated by said diaphragm for intercommunicating said inlet portion with said outlet portion to permit the refrigerant to flow from said evaporator to said compressor through said intercommunicated inlet and outlet portions when the pressure in said pressure chamber is extremely decreased owing to the leakage of the refrigerant.

3. An air conditioning system according to claim 1, wherein said evaporation pressure control device further includes means for rapidly proceeding the intercommunication by said intercommunicating means between said inlet portion and said outlet portion.

4. An air conditioning system according to claim 1, wherein said evaporation pressure control device includes:

a casing having an inlet portion connected to said evaporator and an outlet portion connected to said compressor;

a cylinder secured in said casing for forming an inside chamber communicated with said inlet portion and an outside chamber communicated with said outlet portion, said cylinder having a hole for operatively communicating said inside chamber with said outside chamber;

a piston slidably disposed in said cylinder for controlling the intercommunication through said hole between said inside and outside chambers with the sliding movement thereof to change the opening area of said hole;

a pressure chamber having a deformable diaphragm and formed in said casing, said pressure chamber being in fluid communication with said inside chamber to introduce the refrigerant from said evaporator to said pressure chamber, whereby said diaphragm is deformed in response to the pressure produced by the refrigerant introduced into said pressure chamber;

said piston being connected to said diaphragm so that the sliding movement thereof corresponds to the deformation of said diaphragm to thereby perform the intercommunication control between said inside and outside chambers through said hole;

said piston also having a passage therein for intercommunicating said inside chamber with said outside chamber by said hole to permit the refrigerant to flow from said evaporator to said compressor through said passage when the pressure in said pressure chamber is extremely decreased owing to the leakage of the refrigerant.

5. An air conditioning system according to claim 4, wherein said evaporation pressure control device further includes an opening formed on said cylinder communicating said inside chamber with said outside chamber for decreasing the pressure in said inside chamber by means of a suction effect of said compressor during a time when said hole is closed by said piston, to thereby perform the rapid intercommunication between said inside and outside chambers through said passage and hole.

6. An air conditioning system according to claim 4, wherein said evaporation pressure control device further includes a pressure transferring portion communicating said outside chamber with said expansion valve so as to actuate the same in response to the pressure in said outside chamber.

* * * * *